(12) United States Patent
Ostwald et al.

(10) Patent No.: US 8,760,175 B2
(45) Date of Patent: Jun. 24, 2014

(54) METHOD FOR DETECTING A COVERED DIELECTRIC OBJECT

(75) Inventors: Olaf Ostwald, Munich (DE); Sherif Sayed Ahmed, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 254 days.

(21) Appl. No.: 13/319,294

(22) PCT Filed: Mar. 18, 2010

(86) PCT No.: PCT/EP2010/001723
§ 371 (c)(1),
(2), (4) Date: Nov. 7, 2011

(87) PCT Pub. No.: WO2010/127739
PCT Pub. Date: Nov. 11, 2010

(65) Prior Publication Data
US 2012/0049863 A1    Mar. 1, 2012

(30) Foreign Application Priority Data

May 5, 2009   (DE) .......................... 10 2009 019 992
Sep. 7, 2009  (DE) .......................... 10 2009 040 450

(51) Int. Cl.
| | | |
|---|---|---|
| *G01S 13/00* | (2006.01) | |
| *G01R 27/26* | (2006.01) | |
| *G01S 7/41* | (2006.01) | |
| *G01F 23/00* | (2006.01) | |
| *G01V 8/00* | (2006.01) | |
| *G01S 13/89* | (2006.01) | |
| *G01S 13/88* | (2006.01) | |

(52) U.S. Cl.
CPC .............. *G01S 7/411* (2013.01); *G01F 23/0023* (2013.01); *G01V 8/005* (2013.01); *G01S 13/89* (2013.01); *G01S 13/887* (2013.01)
USPC .............................. 324/642; 342/22; 324/662

(58) Field of Classification Search
CPC ....... G01F 23/0023; G01S 7/411; G01S 13/89; G01S 13/887; G01V 8/005
USPC ...................................... 324/642, 22; 342/22
See application file for complete search history.

(56) References Cited

U.S. PATENT DOCUMENTS 5,206,640 A   4/1993   Hirvonen et al.
6,057,761 A   5/2000   Yukl
(Continued)

OTHER PUBLICATIONS

Crocco, L., et al.: "Early-Stage leaking pipes GPR monitoring via microwave tomographic inversion" in "J. Appl. Geophysics", 2009, vol. 67, pp. 270-277.

(Continued)

*Primary Examiner* — Jermele M Hollington
*Assistant Examiner* — Farhana Hoque
(74) *Attorney, Agent, or Firm* — Ditthavong Mori & Steiner, P.C.

(57) ABSTRACT

The invention relates to a method for detecting a covered dielectric object, where a microwave signal that can be modified in frequency is generated at a particular bandwidth and transmitted in the direction of the covered dielectric object. The microwave signal reflected by the object is then obtained from the three-dimensional measurement result in a lateral, two-dimensional pattern, a highest signal amplitude and a second-highest signal amplitude within a particular time period before or after the received microwave signal is identified in a plurality of pattern points of the pattern. The object is detected if an accumulation of pattern points of the pattern is present, in which the difference in each case between the highest and the second highest signal amplitude of the received microwave signal is less than a defined threshold value.

20 Claims, 11 Drawing Sheets

(56) References Cited

U.S. PATENT DOCUMENTS

| | | | |
|---|---|---|---|
| 6,518,915 B2 | 2/2003 | Schutz et al. | |
| 6,965,340 B1 | 11/2005 | Baharav et al. | |
| 7,511,654 B1 | 3/2009 | Goldman et al. | |
| 2001/0045733 A1* | 11/2001 | Stanley et al. | 280/735 |
| 2005/0231421 A1 | 10/2005 | Fleisher et al. | |
| 2006/0066469 A1* | 3/2006 | Foote et al. | 342/22 |
| 2008/0304044 A1 | 12/2008 | Cooper et al. | |

OTHER PUBLICATIONS

Langenberg, K. J., et. al. "Nondestructive testing of concrete with electromagnetic and elastic waves: Modeling and imaging" in "Cement & Concrete Composites", 2006, vol. 28, pp. 370-383.

Taffe, A., u.a.: Zerstorungsfreie Zustandsermittlung und Qualitatssicherung in der Betoninstandsetzung in "Beton- und Stahlbetonbau", 2005. vol. 100.

International Preliminary Report on Patentability for PCT Application No. PCT/EP2010/001723 dated Nov. 5, 2011, pp. 1-5.

* cited by examiner

METHOD FOR DETECTING A COVERED DIELECTRIC OBJECT

CROSS-REFERENCE TO RELATED APPLICATION

The present application is a national phase application of PCT Application No. PCT/EP2010/001723, filed on Mar. 18, 2010, and claims priority to German Patent Application No. DE 10 2009 019 992.6, filed on May 5, 2009, and German Patent Application No. DE 10 2009 040 450.3, filed on Sep. 7, 2009, the entire contents of which are herein incorporated by reference.

BACKGROUND OF THE INVENTION

1. Field of the Invention

The invention relates to a method for detecting a concealed dielectric object.

2. Discussion of the Background

In security technology, for example, at airports, various technologies have been established for the identification of concealed or covered objects. While ionizing x-ray radiation, which allows the identification of a plurality of objects and materials, is used for monitoring items of luggage and bags, only metal detectors, which detect exclusively objects made of metal are generally used for monitoring people and the clothing worn by people.

In recent years, systems with microwaves and millimeter waves have been developed for detecting objects made of non-metallic materials, which are concealed by people in their clothing. A system and a method for detecting objects made of different materials carried on a human body by means of millimeter waves is specified in U.S. Pat. No. 6,965, 340 B1.

Since millimeter waves are reflected only slightly or not at all in the air and the clothing of the person under investigation and experience an approximately total reflection on metallic objects and on objects with a high water content, such as human skin and human tissue, and a partial reflection on objects with a permittivity between that of air and that of water, dependent upon the permittivity and the thickness of the object, an object made from a non-metallic material, for example, a knife made of ceramic or an explosive powder kept concealed in the proximity of the human body, can be identified by measuring the modulus and the phase of the reflected millimeter waves by means of a focusing method.

However, the method described in U.S. Pat. No. 6,965,340 B1 provides the following disadvantage for the detection of objects kept concealed on a human body:

By comparison with a purely planar object, in the case of an object with a non-flat, especially with an "tapered" surface, the reflected millimeter waves are modified because of a relatively higher scattering complexity. In this case, an image of the original object corresponding spatially with the original object and accordingly a spatially unambiguous and accurate detection of the concealed object is no longer guaranteed.

SUMMARY OF THE INVENTION

The invention advantageously provides a method for detecting concealed objects, which allows an unambiguous detection result with regard to the spatial resolution of the object to be identified and with regard to the correct differentiation between dielectric objects and the human body.

According to the invention, instead of merely observing the modulus and phase of the reflected millimeter waves or microwaves, the interference—that is, the superposition—of the wave reflected in the transmission direction at the front side of the concealed object and of the wave reflected in the transmission direction at the rear side of the concealed object, is observed. Since the modulus of one of the two reflected waves is typically the highest and the modulus of the other of the two reflected waves is typically the second-highest, a concealed object can be detected by identifying a so-called interference response comprising a highest signal amplitude and a second-highest signal amplitude of the reflected microwaves preceding or following in time within a given time interval.

In order to avoid an error detection of interference signals, which is caused by noise or other partial reflections within an object, for example, with locally variable permittivity and/or with structures contained within the object, the difference between the highest and the second-highest signal amplitude of the reflected wave is compared with a fixed threshold value, so that a pair of microwave signals reflected at the front side and at the rear side of the concealed object is only present if the difference between the highest and the second-highest signal amplitude of the reflected microwave signal is smaller than the specified threshold value.

In order to determine the location of the concealed object in relation to the human body under investigation unambiguously in a two-dimensional display, the three-dimensional space which contains the human body with the concealed object, is sampled through three-dimensional focusing of the microwave signals and optionally through receiver-end focusing of the reflected microwave signals. The three-dimensional raster obtained by means of focusing is converted, using a method not presented in greater detail here, into a lateral two-dimensional raster comprising individual raster points with a given raster resolution. The modulus and phase difference of the reflected microwave signal relative to the transmitted microwave signal, determined at the individual raster points of the lateral two-dimensional raster, which is determined in each case over a given bandwidth, is then transformed into the time domain by means of Fourier transform.

Following this, the differences between the highest and second-highest signal of the reflected microwave signal transformed into the time domain and referenced relative to the transmitted microwave signal is determined at every raster point of the lateral, two-dimensional raster and compared with a threshold value. If several coherent raster points at which the respectively determined difference is smaller than the threshold value, exist within the raster, a concealed object has been detected.

The preferred area of application of detecting a concealed object is the detection of a concealed object on the human body, for example, an object kept concealed in an item of clothing, in shoes, in hats and so on, worn by the person. Furthermore, the detection method is also, of course, suitable for objects kept concealed within objects, for example, in bags, suitcases and so on.

The detected object can be, for example, a substance in any possible aggregation condition—solid, liquid or gaseous—wherein the permittivity of the substance must only differ from the high permittivity of water, which is contained to a high degree in perfused tissue. Moreover, there are no restrictions on the shape and on the surface of the object, so that cuboidal, layered or spherical objects, as well as objects with a highly complex shape and surface structure can be reliably and unambiguously detected.

The bandwidth of the transmitted microwave signal should be selected to be indirectly proportional to the thickness of the object to be detected in the transmission direction. The spectrum of the transmitted signal is windowed by the software through filtering by means of Hamming, Hann, Gauss and/or Chebychev filtering. However, the transmission power and the reception sensitivity do not vary in this context.

To minimize any lack of clarity in the detection resulting from mechanical-geometric structures, for example, scattering on the object to be detected, a reprocessing of the amplitude characteristic of the microwave signal, reflected on the concealed object and received at the individual raster points of the lateral, two-dimensional raster, is implemented in the receiver.

For this purpose, in a first embodiment, several respectively adjacent groups comprising a specified number of preferably the same number of raster points positioned adjacent to the respective raster point in the proximity of the respective raster point within an angular segment are specified for every raster point of the lateral raster. Following this, in each group of raster points of the respectively observed raster point, the number of raster points is determined, at which the determined difference between a highest and the second-highest amplitude of the time response of the reflected microwave signal disposed within a selected time interval is smaller than the specified threshold value. If a previously specified number of raster points with a relatively smaller difference between the highest and the second-highest registered amplitude of the time response of the reflected microwave signal by comparison with the specified threshold value have been counted, the respectively observed point is added to the accumulation of raster points which characterise a concealed object.

This guarantees that only a raster point which is surrounded in a directly adjacent manner in all directions by a specified minimum number of raster points which also provide a relatively smaller difference between the highest and second-highest registered amplitude of the time response of the reflected microwave signal by comparison with the specified threshold value, is added to the accumulation of raster points detecting a concealed object. Accordingly, for the further detection processing, only agglomerations of adjacent raster points with a respectively relatively smaller difference between the highest and the second-highest registered amplitude of the time response of the reflected microwave signal by comparison with the specified threshold value are pursued further, while single raster points, raster points which are associated with one-dimensional arrangements such as lines, and raster points which cover only small areas or only several non-coherent areas of a relatively larger area, are not considered further.

In a second embodiment, starting from a raster point which provides a relatively smaller difference between the highest and the second-highest registered signal amplitude of the reflected microwave signal by comparison with a specified threshold value, a search is carried out successively in several search steps in both directions and in both dimensions of the raster, in each case for directly adjacent raster points which each provide a relatively smaller difference between the highest and the second-highest registered signal amplitude of the reflected microwave signal by comparison with a specified threshold value. If this interference criterion is present, the respective raster point is added to the group of coherent raster points. When all raster points of the raster have been investigated in this manner, a test is carried out on the basis of criteria to determine whether the group of coherent raster points determined represents an accumulation of raster points. One criterion is, for example, whether the number of raster points of the group of coherent raster points is disposed above a minimum number.

On the one hand, in order to display irregularities in the detection of the concealed object at the edge of the accumulation of raster points and, on the other hand, to display the detected object in its original size, the accumulation preferably of raster points is supplemented with raster points which are positioned within an edge region surrounding the accumulation preferably of raster points. The width of the edge region can be adjusted respectively, dependent upon the achieved quality of the detection of the object to be determined.

In an equivalent manner, raster points with a relatively larger difference between the highest and the second-highest registered signal amplitude by comparison with the specified threshold value within an accumulation of raster points, which have erroneously not been added to the accumulation of raster points after the first processing steps, can still be added retrospectively in order to improve the detection result.

In order to display the concealed object on a screen which images the entire, registered, lateral two-dimensional raster, the raster points associated with the identified accumulation of raster points can preferably be provided with a given first colour. The raster points not associated with the accumulation of raster points are provided with a second colour. As an alternative, an image information of the associated raster point of the rastered human body can be assigned to the raster points not associated with the accumulation of raster points, which can be present as a modulus image or as an optical photo. In this manner, the position of the detected object relative to the human body can be recognised in an improved manner.

Finally, it is possible to detect the concealed object multiple times within a given time raster. In this manner, a detection of the concealed object can be implemented with a moving human body. The imaging sequence of the concealed object can offer an additional image information about the concealed object, which leads to an improved detection result because of the different orientation of the concealed object during the movement.

BRIEF DESCRIPTION OF THE DRAWINGS

An exemplary embodiment of the method according to the invention for detecting a concealed dielectric object is explained in greater detail by way of example with reference to the drawings. The drawings are as follows.

DETAILED DESCRIPTION OF EXEMPLARY EMBODIMENTS OF THE INVENTION

Figure 12A:
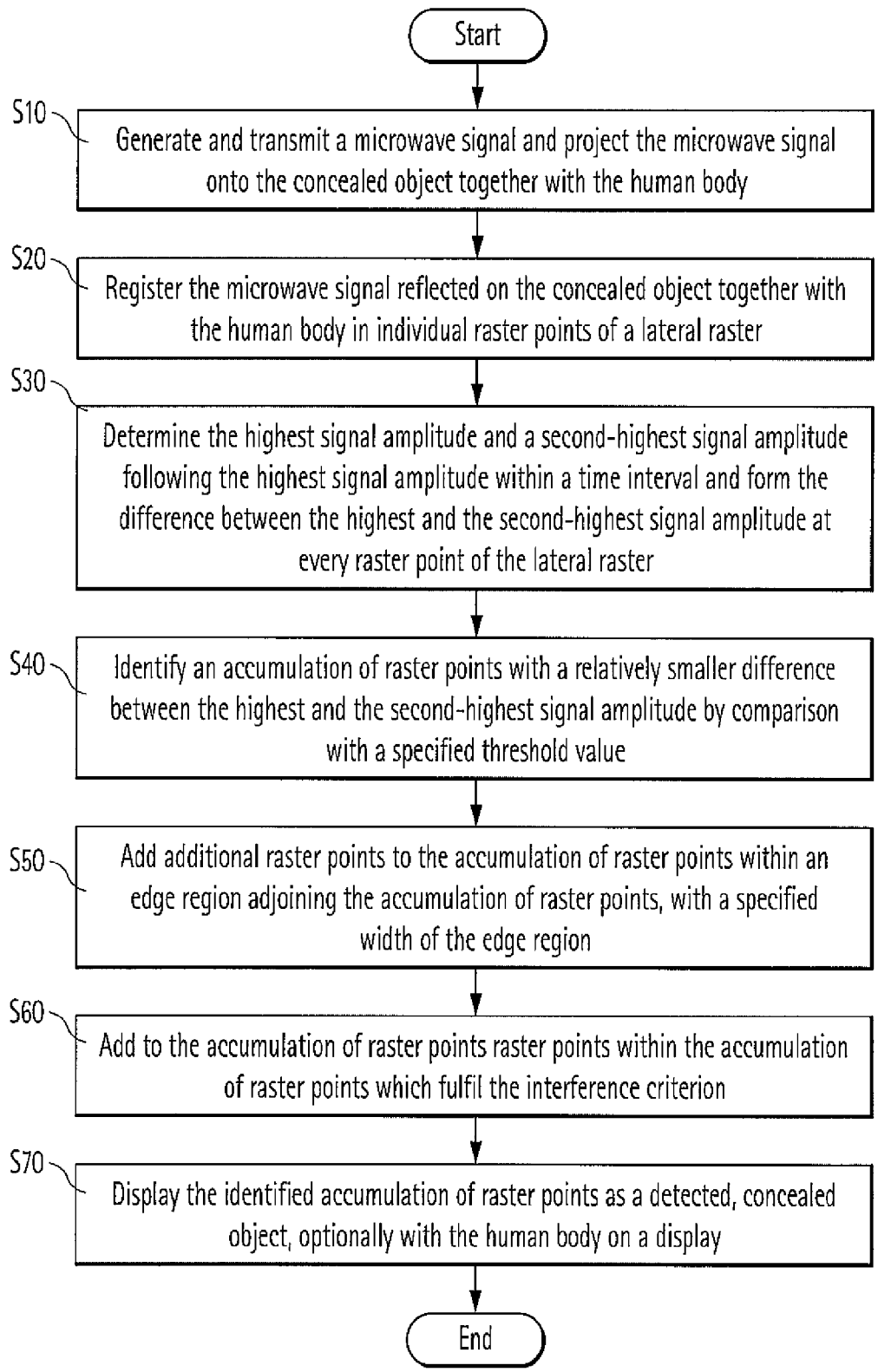
FIG. 12A,12B,12C show a flow chart of a method according to the invention for detecting a concealed dielectric object.

In the following section, the method according to the invention for detecting a concealed dielectric object, in particular, an object concealed on the human body, is explained in detail with reference to the flow diagrams in FIGS. 12A, 12B and 12C. In this context, reference is made to an arrangement for detecting dielectric objects concealed on the human body as specified in FIG. 14.

Figure 1C:
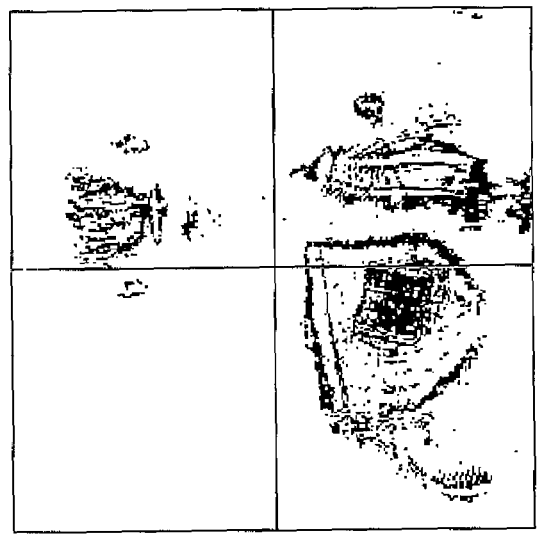
FIGS. 1A, 1B, 1C show a view of several dielectric objects to be detected attached to a human body, an image of an associated modulus response and an associated interference response.
Figure 1B:
Figure 1A:
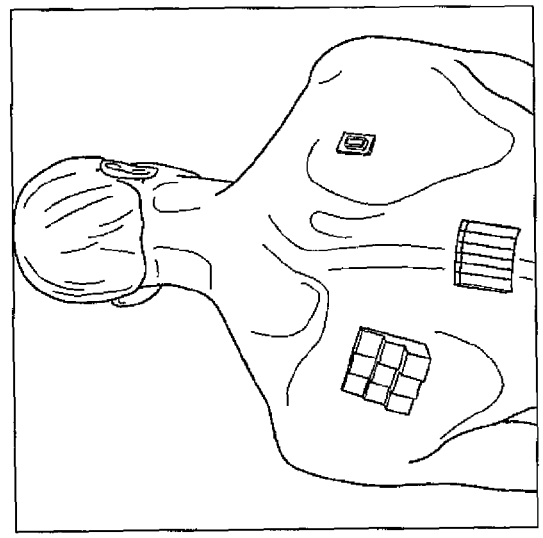

To allow an understanding of the drawings to be explained in detail below, reference is made here to an arrangement of different objects with a given permittivity, which are attached to a human body, as shown in FIG. 1A. The associated modulus response and the associated interference response are presented in FIGS. 1B and 1C.

In the first method step S10, a microwave signal is generated with a given bandwidth and transmitted in the direction towards the concealed object, especially in the direction of the human body in the clothing of which the object to be detected is concealed. The generation of the microwave signal is implemented, for example, in a signal generator of a network analyser (NWA) 1. The bandwidth ($\Delta f$) of the microwave signal is designed in accordance with equation (1) to be indirectly proportional to the depth resolution and accordingly to the thickness ($\Delta L$) in the transmission direction of the object to be detected, wherein (c) denotes the propagation velocity of the microwave signal within the respective dielectric material.

$$\Delta f = \frac{c}{2 \cdot \Delta L} \quad (1)$$

Figure 14:
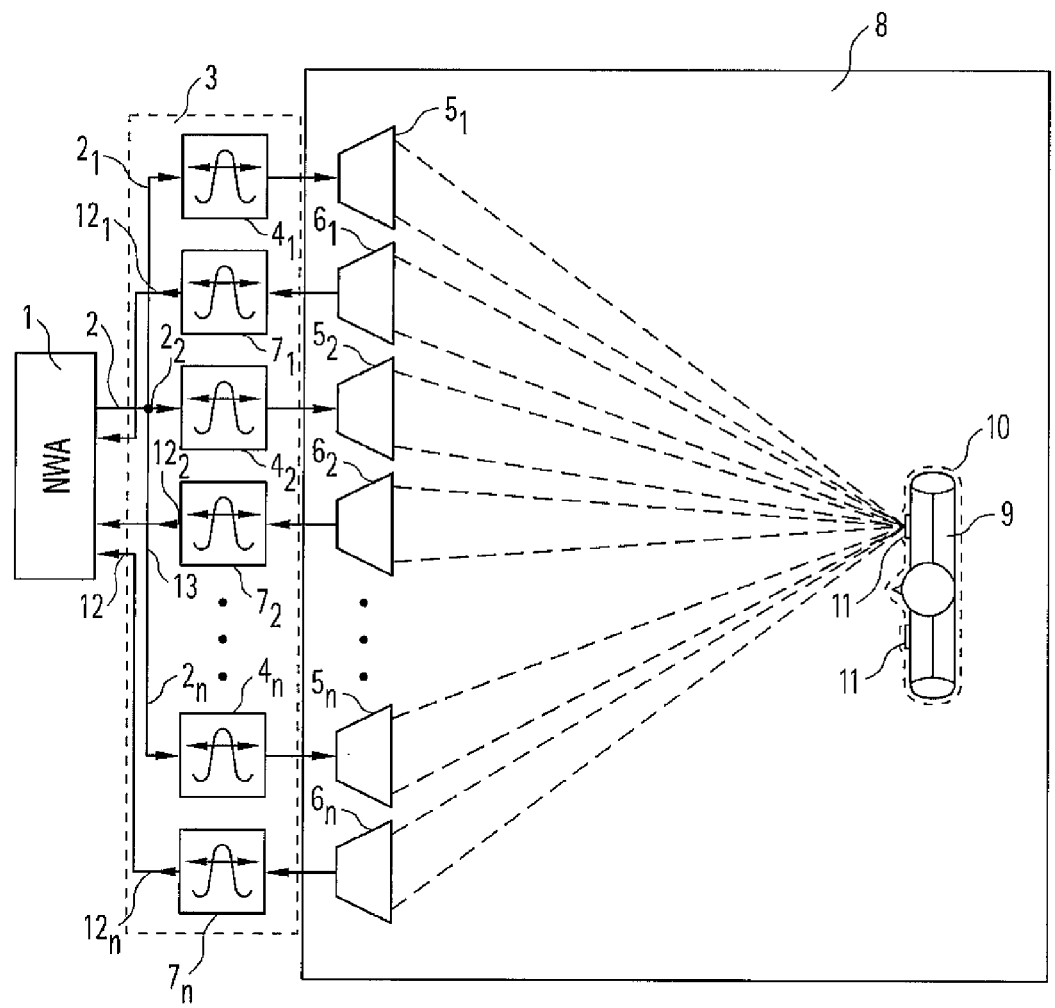
FIG. 14 shows an arrangement for detecting a concealed object on the human body, which can be used for the implementation of the method.

The microwave signal generated in the network analyser 1 is supplied via the connecting line 2, for example, a coaxial cable, to a signal splitter not illustrated in FIG. 14, which divides the microwave signal into identical partial microwave signals and relays them respectively via a connecting line $2_1$, $2_2$, ..., $2_n$ to a transmission-end focusing sub-unit $4_1$, $4_2$, ..., $4_n$ of the focusing unit 3 associated with the respective microwave signal. In the individual transmission-end focusing sub-units $4_1$, $4_2$, ..., $4_n$, the respective partial microwave signal is conditioned by the software, for example, with a digital-beam-forming algorithm to such an extent that the respective partial microwave signal is focused in a transmission antenna $5_1$, $5_2$, ..., $5_n$ adjoining the focusing unit 3, for example, in a horn antenna, respectively onto the spatial point to be sampled. In this context, the individual partial microwave signals are displaced in their phase relative to one another corresponding to the respective distance of the individual transmission antenna $5_1$, $5_2$, ..., $5_n$ from the spatial point to be focused. The partial microwave signals transmitted by the individual transmission antennas $5_1$, $5_2$, ..., $5_n$ are focused respectively in a sequential manner onto the individual spatial point within the observation space 8.

The partial microwave signals projected onto the human body 9 are reflected on the human body 9 and also on the objects 11 held concealed on or within the clothing 10 indicated by dotted lines in FIG. 14 and indicated in FIG. 14.

Figure 2:
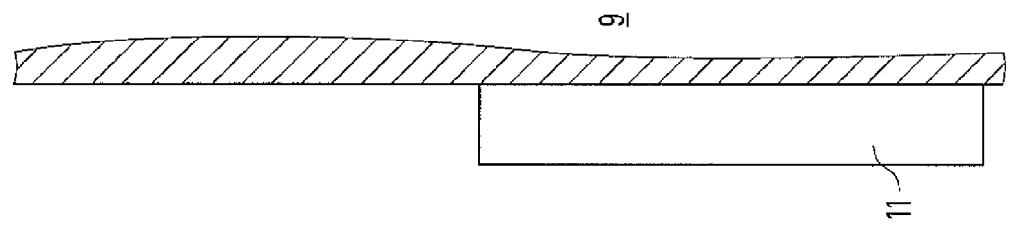
FIG. 2 shows a time diagram of a transmitted microwave, a singly reflected microwave and a doubly reflected microwave.
Figure 2:
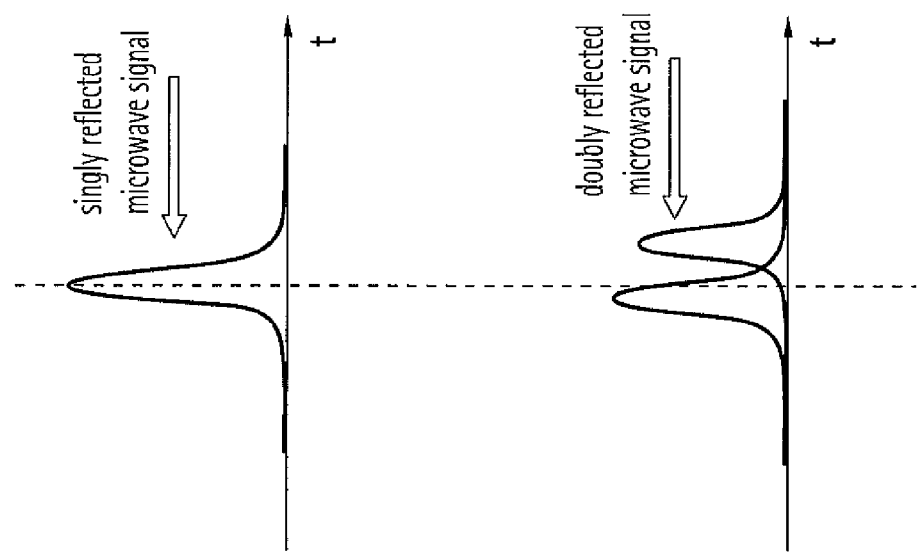

As shown in FIG. 2, while a transmitted microwave signal experiences approximately a total reflection on the surface of the human body 9 because of its high water content, on an object 11 to be detected with an attenuation relatively lower than the attenuation of water, it experiences a first partial reflection at the front side of the object 11 and a second partial reflection at the rear side of the object 11. Accordingly, in the case of an approximately total reflection on the human body 11, a reflected microwave signal is obtained from a single impulse and, in the case of the two or multiple partial reflections on the object 11 to be detected, a reflected microwave signal with a double impulse or a multiple impulse is obtained. The reflected microwave signal comprising at least one double impulse from the object 11 to be detected, which can also be interpreted as interference from two partially reflected microwave signals and accordingly as a so-called interference response, therefore presents a differentiation criterion for the totally reflected microwave signal from a single impulse on the human body 9.

The respectively reflected partial microwave signals are received in associated reception antennas $6_1$, $6_2$, ..., $6_n$ and supplied to downstream reception-end focusing sub-units $7_1$, $7_2$, ..., $7_n$ of the focusing unit 3. In the reception-end focusing sub-units $7_1$, $7_2$, ..., $7_n$, the partial microwave signals reflected at one spatial point are focused relative to one another. Via connecting lines $12_1$, $12_2$, ..., $12_n$, the partial microwave signals focused in the individual focusing sub-units $7_1$, $7_2$, ..., $7_n$ are supplied to different ports of the multi-port network analyser 1. The modulus and the phases the individual partial microwave signals are registered relative to one another corresponding to the respective distance of the spatial point to be focused from each reception antenna $6_1$, $6_2$, ..., $6_n$. A reduced number of transmission antennas can also be used as an alternative instead of n transmission antennas $5_1$, $5_2$, ..., $5_n$. Only a single transmission antenna $5_1$ without transmission-end focusing can also be used. The number of reception antennas $6_1$, $6_2$, ..., $6_n$ can also be varied according to the desired reception-end focusing quality. The reception focusing is preferably implemented within the network analyser in a purely computational manner, without the physical presence of the focusing sub-units $7_1$, $7_2$, ..., $7_n$.

Instead of the synthetic focusing presented here, a physical focusing by means of a physically realised transmission-end and/or reception-end focusing device, for example, with a Fresnel reflector with adjustable piezoelectric reflector elements, can be implemented. Instead of a network analyser, another phase-sensitive transmission-reception device can also be used.

In the next method step S20, the received microwave signal, which has been reflected in the form of a raster from the individual positions of the human body 9 and from the individual positions of the object 11 held concealed on the human body 9, is also registered in the network analyser 1 or in a signal processing unit connected downstream of the network analyser 1 in the frequency domain in the form of a raster at individual raster points of a lateral two-dimensional raster image corresponding to the lateral, two-dimensional image of the human body 9, transformed into the time domain and buffered.

In the next method step S30, the respective highest signal amplitude of the reflected microwave signal and the respective second-highest signal amplitude of the reflected microwave signal within a given, previously specified time interval before or after the occurrence of the highest signal amplitude is determined, in the network analyser 1 or in a signal processing unit connected downstream of the network analyser 1, from the buffered sampling values of the reflected microwave signal, over a registration interval, for every raster point of the lateral two-dimensional raster.

Figure 3:
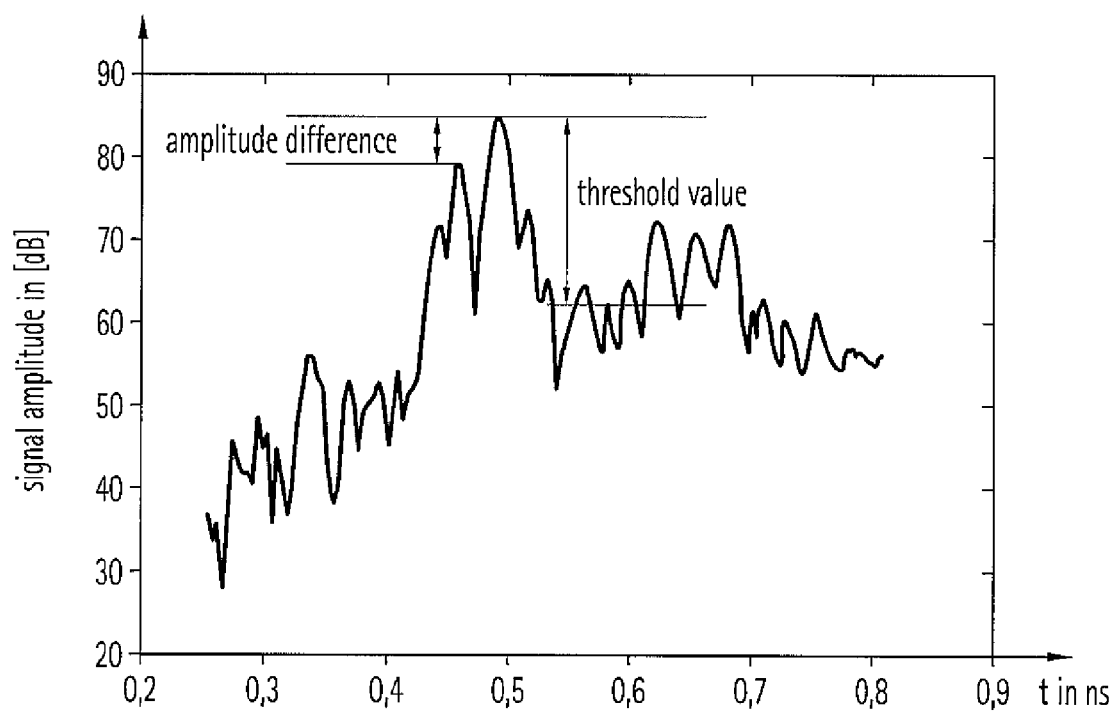
FIG. 3 shows a time diagram with the time characteristic of a reflected microwave signal.

Following this, as shown in FIG. 3, the difference between the highest and the second-highest signal amplitude of the microwave signal determined at each raster point is formed, and the difference is compared with a threshold value. If the difference between the highest and the second-highest signal amplitude of the microwave signal is smaller than a threshold value, which is referred to below as the interference criterion, a double reflection of the transmitted microwave signal on a concealed dielectric object 11 and accordingly an interference response is present. Otherwise, the highest signal amplitude of the microwave signal has been compared, for example, with a noise-signal peak, and there is no interference present.

Figure 4:
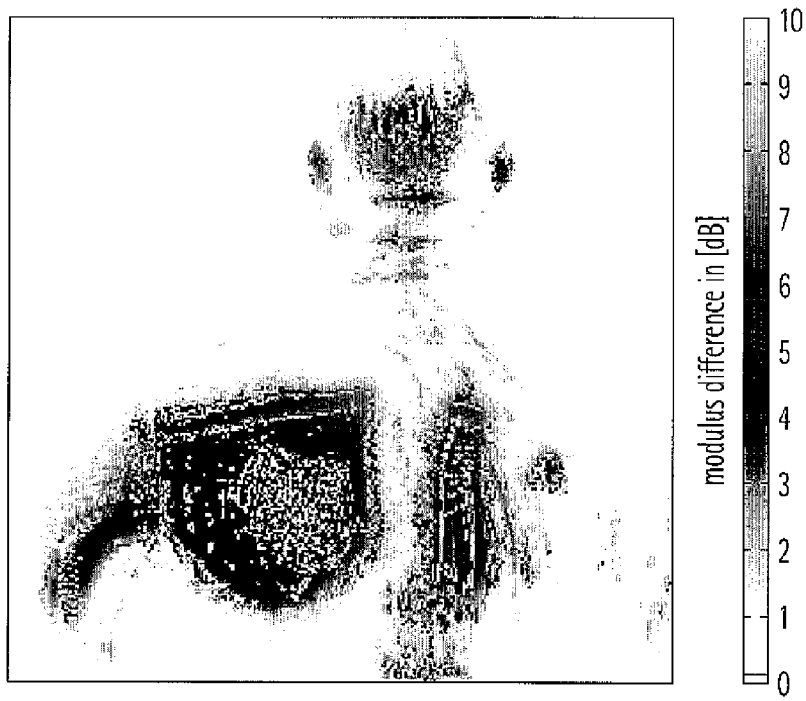
FIG. 4 shows an image of a two-dimensional interference response of a human body provided with dielectric objects to be detected with a display of the various differences.
Figure 5:
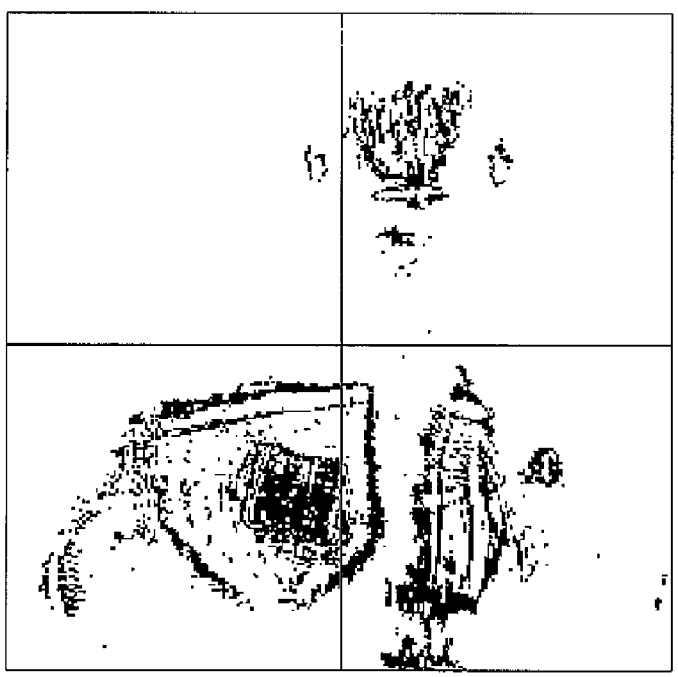
FIG. 5 shows an image of an interference response of a human body provided with dielectric objects to be detected, without a display of the various differences.

In FIG. 4, against the background of a modulus response of the human body 9, the differences determined at the individual raster points between the highest and the second-highest signal amplitude of the microwave signal are displayed in different grey scales corresponding to the respectively determined modulus of the difference. By contrast with this, FIG. 5 presents the differences identified respectively at individual raster points between the highest and the second-highest signal amplitude of the microwave signal independently of the respective modulus of the difference in a single grey scale.

In the next method step S40, the determination of accumulations of adjacent raster points which each fulfil the interference criterion, is implemented.

Figure 12B:
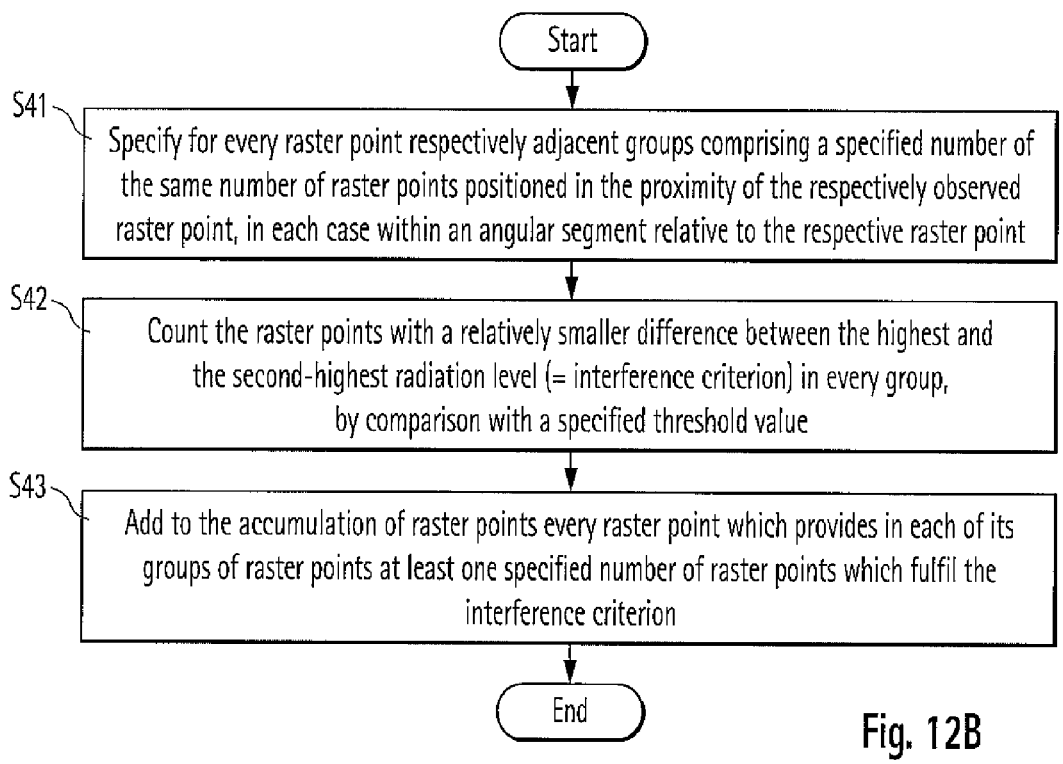
Figure 12C:
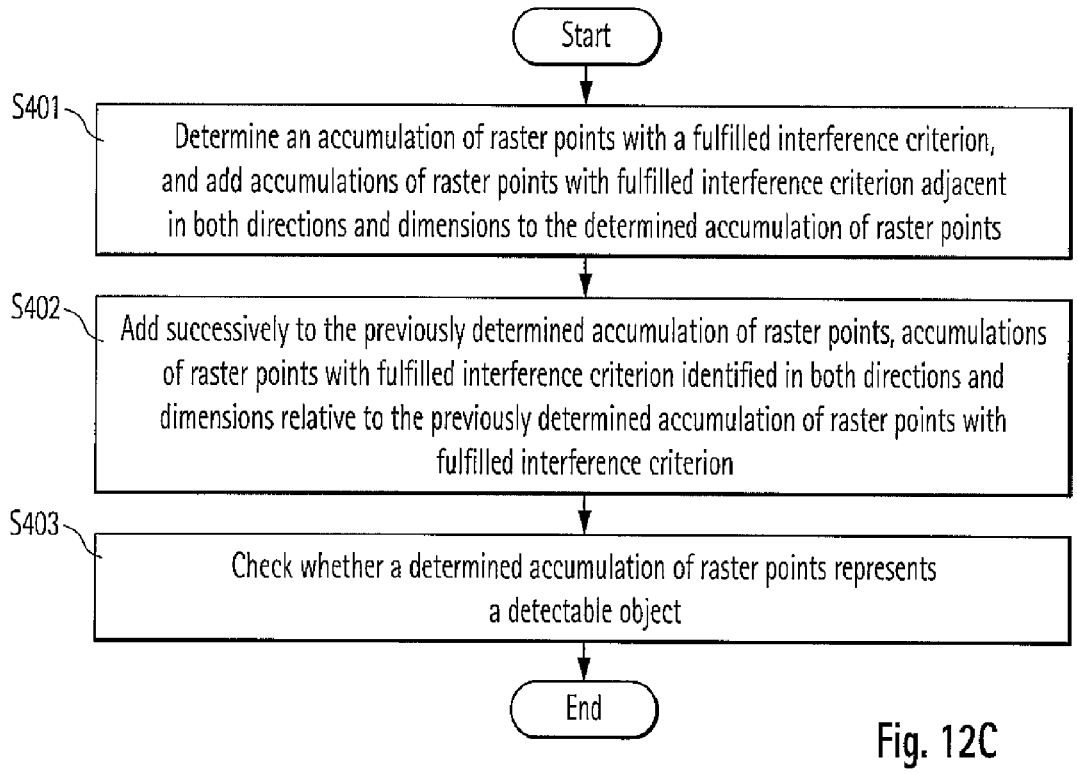
Figure 13A:
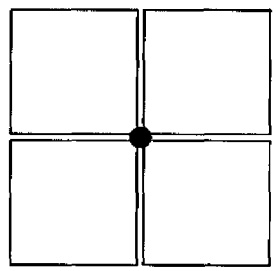
FIG. 13A,13B,13C show a first, second and third embodiment for determining an accumulation of raster points.
Figure 13B:
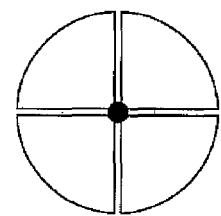
Figure 13C:
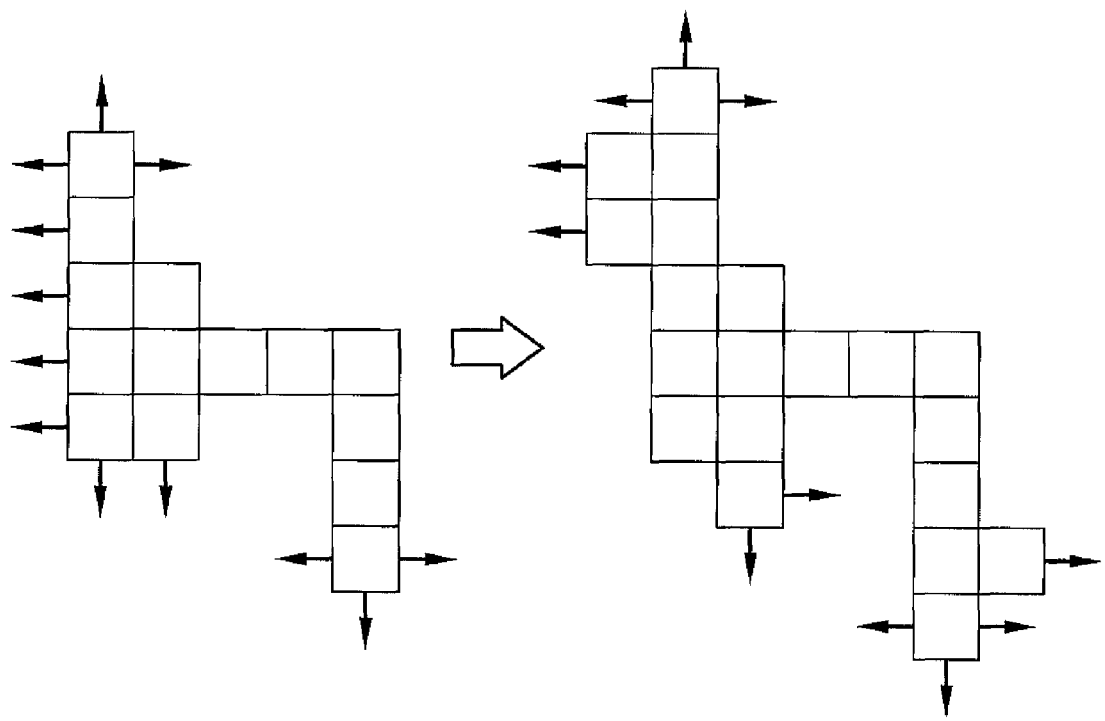

In the first embodiment of the sub-method for determining an accumulation of adjacent raster points according to the flow chart in FIG. 12B, respectively adjacent groups comprising, in each case, a specified number of preferably the same number of raster points positioned in the proximity of the respective raster point, in each case, within an angular segment relative to the respective raster point, are specified for every raster point of the lateral, two-dimensional raster, in a first sub-method step S41. For example, according to FIG. 13A, these may be raster points arranged respectively in 4 preferably equally large squares, which are arranged around a raster point illustrated as a black dot in FIG. 13A; or, for example, according to FIG. 13B, these may be raster points arranged in preferably 4 equally large angular segments of a circle, which are also arranged around a raster point illustrated as a black dot in FIG. 13B. Moreover, further embodiments of groups of respectively adjacent raster points, which, in each case, contain an identical or a different number of raster points, comprising in each case raster points in the proximity of the respectively observed raster point and forming an angular portion relative to the respectively observed raster point, are conceivable and are covered by the invention.

In the next sub-method step S42 of the first embodiment of the sub-method for determining an accumulation of raster points, the number of raster points which each fulfil the interference criterion is counted for every group of raster points.

Finally, in the concluding sub-method step S43 of the first embodiment of the sub-method for determining an accumulation of raster points, that raster point, in whose associated groups of raster points a specified minimum number of raster points which fulfil the interference criterion have been counted in the preceding sub-method step S42, is added to the accumulation of raster points.

In a second embodiment of the sub-method for determining an accumulation of adjacent raster points, in a first sub-method step S401, an accumulation of raster points which each fulfil the interference criterion, is determined according to the sub-method steps S41, S42 and S43 of the first embodiment of the sub-method for determining an accumulation of adjacent raster points. An accumulation of raster points determined in this manner accordingly corresponds to a box in FIG. 12C. Starting from an accumulation of adjacent raster points determined in this manner, corresponding to FIG. 12C, which each fulfil the interference criterion, adjacent accumulations of raster points which each fulfil the interference criterion are sought in both directions and in both dimensions of the lateral, two-dimensional raster. If accumulations of raster points with respectively fulfilled interference criterion are present in the neighbourhood of the first determined accumulation of raster points with fulfilled interference criterion, these accumulations of raster points are added to the first determined accumulation of raster points thereby forming an accumulation of raster points at a superordinate macro-level.

In the next sub-method step S402, adjacent accumulations of raster points, which once again each fulfil the interference criterion, are sought, once again starting from the previously determined accumulation of raster points, successively in several respectively successive search steps, in both directions and in both dimensions of the lateral, two-dimensional raster, and added to the previously determined accumulation of raster points.

When all raster points of the lateral, two-dimensional raster have been investigated in this manner, it is determined in the concluding sub-method step S403 on the basis of several criteria, whether the determined accumulation of raster points provides a given minimum number of raster points within a given area and accordingly represents a detectable object. In order to exclude linear accumulations of raster points which are caused by body contours or can be caused by seams or creases in the clothing 10, or which are caused by irradiation limits, the raster points occurring at the outermost edge of the determined accumulation of raster points in both directions of both dimensions of the raster respectively, are determined, and their spacing distance is calculated and, in each case, compared with a minimum spacing distance specified for each dimension of the raster. The determined accumulation of raster points represents a detectable object, if the determined spacing distances between the respectively extreme raster points in both dimensions are greater in each case than the specified minimum spacing distances.

Figure 6:
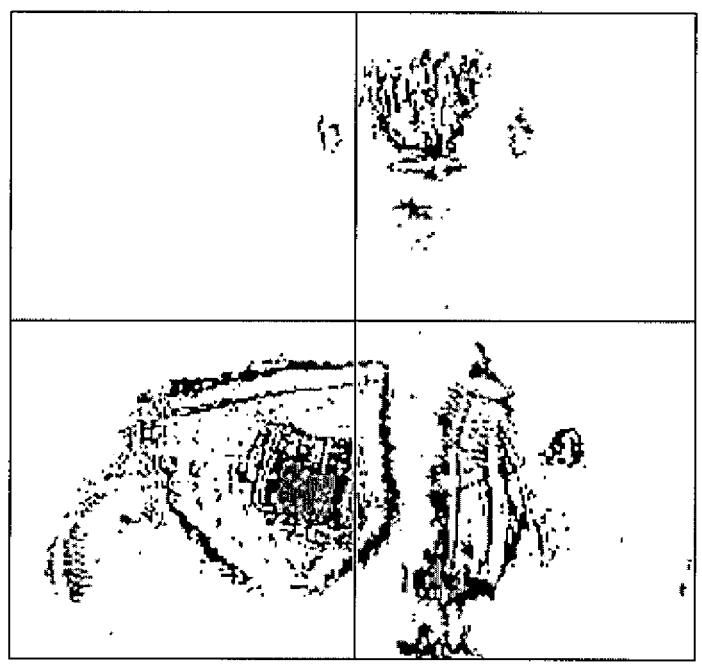
FIG. 6 shows an image of an interference response with an accumulation of raster points, which fulfil an interference criterion.

In FIG. 6, the accumulations of adjacent raster points identified in the sub-method, which are each supposed to represent a concealed object 8, are displayed in a grey shading. By way of comparison, the raster points which provide a certain difference between the highest and the second-highest signal amplitude of the reflected microwave signal but which are not associated with the accumulation of adjacent raster points, are displayed in a white colour in FIG. 6. These raster points relate to microwave signals reflected on the human body 9, which are superimposed, for example, with a noise. However, in this context, reference is made to the fact that positions without a reflection also are shown in white.

Figure 7:
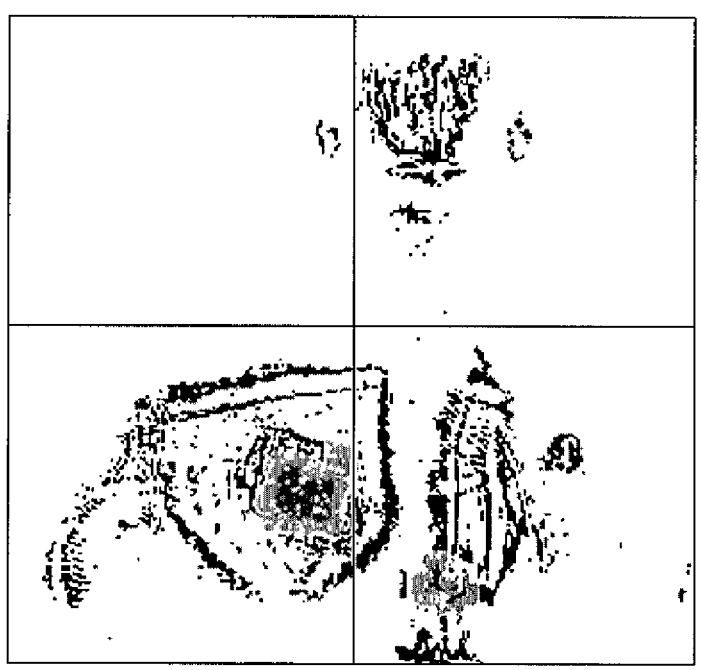
FIG. 7 shows an image of an interference response as an accumulation of raster points with a supplementary edge region.

In the method step S50, following the sub-method for the identification of an accumulation of adjacent raster points, additional raster points identified around every identified accumulation of adjacent raster points are added to an edge region adjoining the accumulation of adjacent raster points. The width of the edge region is equally strongly pronounced over its entire course and is specified in advance. The width of the edge region can be individually adjusted for each individual accumulation of adjacent raster points, for example, dependent upon the specific size or the specific contour of the identified accumulation of adjacent raster points. FIG. 7 displays the raster points of the added edge region in a dark grey colour and shows the raster points of the originally identified accumulation of adjacent raster points in a pale grey colour.

Figure 8:
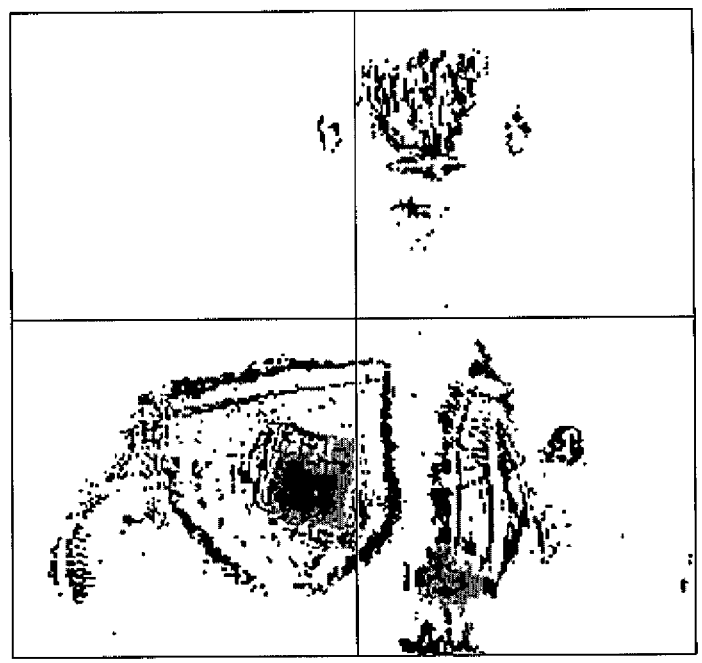
FIG. 8 shows an image of an interference response with raster points within an accumulation of raster points which do not fulfil the interference criterion.
Figure 9:
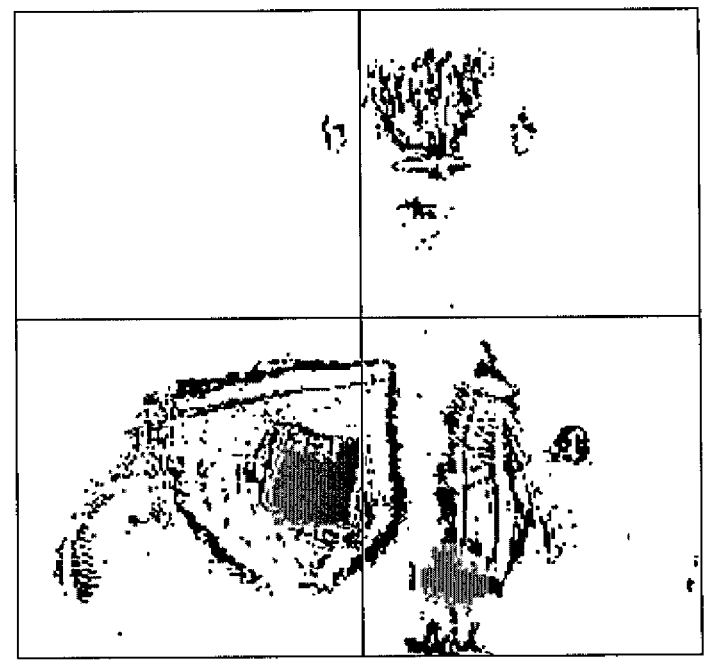
FIG. 9 shows an image of an interference response with an accumulation of raster points which fulfil the interference criterion or which do not fulfil the interference criterion, but which are disposed within an accumulation of raster points which fulfil the interference criterion.

If raster points which are not associated with the accumulations of adjacent raster points, as illustrated in FIG. 8 in a white colour by way of demarcation from the raster points of the accumulation of raster points indicated in the pale grey colour, exist within individual accumulations of adjacent raster points, these are added in the next method step S60 to the respective accumulations of adjacent raster points. This is illustrated in FIG. 9, in which all raster points within the individual accumulations of adjacent raster points are marked in a pale grey colour.

In the final method step S70, the identified accumulations of adjacent raster points which are supposed to indicate the objects 9 to be detected, are displayed on a screen (display). The display comprises all of the raster points of the lateral, two-dimensional raster.

Figure 10:
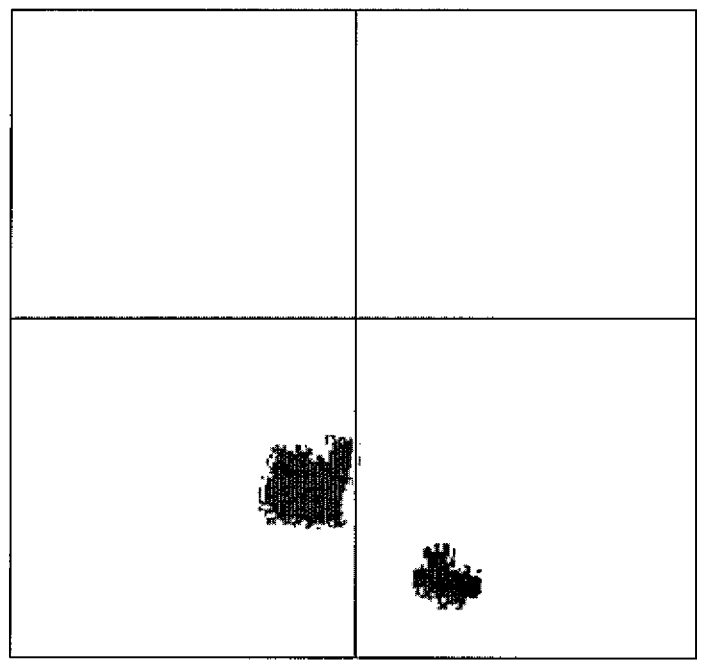
FIG. 10 shows a first embodiment of a graphic display of a detected object.

In the first embodiment for the display of concealed objects, as shown in FIG. 10, the raster points associated with the individual accumulations of adjacent raster points are displayed in the first colour, here, in a grey colour, while the raster points not associated with the accumulations of adjacent raster points are displayed in a second colour, here, in a black colour.

Figure 11:
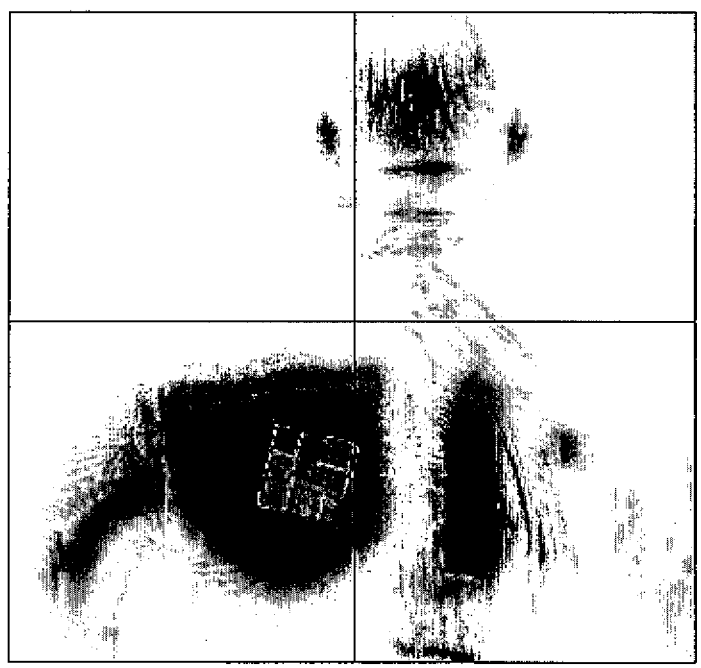
FIG. 11 shows a second embodiment of a graphic display of a detected object.

In a second embodiment for the display of concealed objects, the raster points which are not associated with the identified accumulations of adjacent raster points contain corresponding image information of the human body 9 to allow improved localisation of the concealed objects 11 relative to the human body 9, according to FIG. 11.

As illustrated in FIG. 11, these can be the values of the modulus response for the registered human body 9 presented in given grey shades, or also the image points of a recorded photograph of the human body 9 presented in individual grey shades.

The invention is not restricted to the individual embodiments. A purely time-domain orientated method, that is, a method based on a pulsed radar measurement with a transient recorder replacing the network analyser, is also covered by the invention.

The invention claimed is:

1. A method for detecting a concealed dielectric object, said method comprising:
   generation and transmission of a microwave signal in the direction towards the concealed object,
   registration of the microwave signal reflected from the object in a spatial raster,
   identification of a highest signal amplitude and a second highest signal amplitude preceding or following the highest signal amplitude within a given time interval over the time course of the registered microwave signal at several raster points of the raster,
   formation of a difference between the highest and second-highest signal amplitude of the registered microwave signal determined at each raster point and comparison of the difference with an specified threshold value, and
   detection of the object if an accumulation of raster points of the raster at which the difference between the highest and the second-highest signal amplitude of each registered microwave signal is smaller than the specified threshold value, is present.

2. The method according to claim 1, wherein the object is a substance with a permittivity different from the permittivity of the human body and of the air of the surrounding atmosphere.

3. The method according to claim 2, wherein the concealed object is disposed within or beneath an item of clothing which is worn on a human body.

4. The method according to claim 2, wherein the spectrum of the generated microwave signal is windowed by means of filtering, preferably by means of filtering according to Hamming, Hann, Gauss or Chebychev.

5. The method according to claim 2, wherein the identification of an accumulation of raster points comprises the following method steps:
   specification of several adjacent groups each comprising a specified number of preferably an identical number of adjacent raster points for every raster point, which are each positioned in the proximity of the respective raster point, in an angular segment relative to the respective raster point,
   counting of raster points with a difference between the highest and second-highest signal amplitude within each group of raster points disposed below the threshold value, and
   identification of a raster point associated with the accumulation of raster points, if at least one specified number of raster points with a difference between the highest and the second-highest signal amplitude disposed below the threshold value are present respectively in each of its associated groups of raster points.

6. The method according to claim 2, wherein the identification of an accumulation of raster points comprises the following method steps:
   successive addition of raster points in each case directly adjacent in two directions to a raster point with a difference between the highest and the second-highest signal amplitude disposed below the threshold value, to a group of coherent raster points, if a difference between the highest and the second-highest signal amplitude disposed below the threshold value has been determined within the raster points.

7. The method according to claim 2, wherein raster points positioned within the accumulation of raster points which each provide a difference between the highest and the second-highest signal amplitude disposed above the threshold value, are added to the accumulation of raster points.

8. The method according to claim 1, wherein the concealed object is disposed within or beneath an item of clothing which is worn on a human body.

9. The method according to claim 8, wherein the raster points not associated with the accumulation of raster points contains a rastered image of the human body.

10. The method according to claim 9, wherein the concealed dielectric object is detected repeatedly within a given time raster, and the detected values associated with different time rasters are correlated or averaged.

11. The method according to claim 8, wherein the raster points not associated with the accumulation of raster points contains an optical image of the human body.

12. The method according to claim 8, wherein the concealed dielectric object is detected repeatedly within a given time raster, and the detected values associated with different time rasters are correlated or averaged.

13. The method according to claim 1, wherein the spectrum of the generated microwave signal is windowed by means of filtering, preferably by means of filtering according to Hamming, Hann, Gauss or Chebychev.

14. The method according to claim 1, wherein the identification of an accumulation of raster points comprises the following method steps:
- specification of several adjacent groups each comprising a specified number of preferably an identical number of adjacent raster points for every raster point, which are each positioned in the proximity of the respective raster point, in an angular segment relative to the respective raster point,
- counting of raster points with a difference between the highest and second-highest signal amplitude within each group of raster points disposed below the threshold value, and
- identification of a raster point associated with the accumulation of raster points, if at least one specified number of raster points with a difference between the highest and the second-highest signal amplitude disposed below the threshold value are present respectively in each of its associated groups of raster points.

15. The method according to claim 14, wherein the identified accumulation of raster points is supplemented by those raster points which are positioned within an edge region surrounding the accumulation of raster points, wherein the width of the edge region can be specified.

16. The method according to claim 1, wherein the identification of an accumulation of raster points comprises the following method steps:
- successive addition of raster points in each case directly adjacent in two directions to a raster point with a difference between the highest and the second-highest signal amplitude disposed below the threshold value, to a group of coherent raster points, if a difference between the highest and the second-highest signal amplitude disposed below the threshold value has been determined within the raster points.

17. The method according to claim 16, wherein the identified accumulation of raster points is supplemented by those raster points which are positioned within an edge region surrounding the accumulation of raster points, wherein the width of the edge region can be specified.

18. The method according to claim 1, wherein raster points positioned within the accumulation of raster points which each provide a difference between the highest and the second-highest signal amplitude disposed above the threshold value, are added to the accumulation of raster points.

19. The method according to claim 1, wherein the raster points associated with the identified accumulation of raster points are displayed on a screen displaying the entire, lateral, two-dimensional raster with a first marking, especially in a first colour.

20. The method according to claim 1, wherein the raster points not associated with the accumulation of raster points are displayed on the screen with a second marking, especially in a second colour.

* * * * *